US010401931B2

United States Patent
Hsiao et al.

(10) Patent No.: US 10,401,931 B2
(45) Date of Patent: Sep. 3, 2019

(54) POWER DELIVERY ARCHITECTURE TO INCREASE PERFORMANCE OF COMPUTING SYSTEMS WHEN DOCKED

(71) Applicant: Intel Corporation, Santa Clara, CA (US)

(72) Inventors: Jimmy Y. Hsiao, Taipei (TW); Tawfik M. Rhal-Arabi, Tigard, OR (US); Chang-Wu Yen, Taipei (TW)

(73) Assignee: INTEL CORPORATION, Santa Clara, CA (US)

( * ) Notice: Subject to any disclaimer, the term of this patent is extended or adjusted under 35 U.S.C. 154(b) by 259 days.

(21) Appl. No.: 14/978,278

(22) Filed: Dec. 22, 2015

(65) Prior Publication Data

US 2017/0177049 A1  Jun. 22, 2017

(51) Int. Cl.
  *G06F 1/00*  (2006.01)
  *G06F 1/26*  (2006.01)
  *G06F 1/32*  (2019.01)
  *G06F 13/40*  (2006.01)
  *G06F 1/16*  (2006.01)

(52) U.S. Cl.
  CPC ............ *G06F 1/266* (2013.01); *G06F 1/1632* (2013.01); *G06F 1/263* (2013.01); *G06F 13/4081* (2013.01)

(58) Field of Classification Search
  CPC ........................................................ G06F 1/32
  See application file for complete search history.

(56) References Cited

U.S. PATENT DOCUMENTS

| 5,884,049 | A | 3/1999 | Atkinson | |
| 2004/0064621 | A1* | 4/2004 | Dougherty | G06F 1/1632 710/303 |
| 2007/0101039 | A1* | 5/2007 | Rutledge | G06F 1/1632 710/303 |
| 2008/0002350 | A1* | 1/2008 | Farrugia | G06F 1/1632 361/679.43 |
| 2008/0102765 | A1* | 5/2008 | Louks | G06F 1/1632 455/90.1 |

(Continued)

FOREIGN PATENT DOCUMENTS

KR   1020020050270   6/2002

OTHER PUBLICATIONS

Notification of Transmittal of the International Search Report and the Written Opinion of the International Searching Authority issued for International Patent Application No. PCT/US2016/055803, dated Jan. 23, 2017.

(Continued)

*Primary Examiner* — Mohammed H Rehman
(74) *Attorney, Agent, or Firm* — Womble Bond Dickinson (US) LLP

(57) ABSTRACT

A power delivery architecture for a computing system is described. In one embodiment, an apparatus comprises a docking station; and a computing system removably coupled to the docking station and having a plurality of components and a power delivery subsystem to deliver power to integrated circuit (IC) components under direction of a controller, where the controller is communicably coupled to the docking station when the docking station is coupled to the computing system to cause power from the docking station to be delivered to at least one of the components with power from the power delivery system.

23 Claims, 8 Drawing Sheets

(56) References Cited

U.S. PATENT DOCUMENTS

| | | |
|---|---|---|
| 2008/0122412 A1 | 5/2008 | Burton et al. |
| 2012/0139500 A1 | 6/2012 | Ye et al. |
| 2013/0145195 A1* | 6/2013 | Collopy ................ G06F 1/1624 713/330 |
| 2014/0108694 A1 | 4/2014 | Chung et al. |
| 2014/0184143 A1 | 7/2014 | Coakley et al. |
| 2014/0236380 A1* | 8/2014 | Alton ...................... G06F 1/206 700/299 |
| 2017/0054302 A1* | 2/2017 | Nirantare ................ H02J 5/005 |
| 2017/0093173 A1* | 3/2017 | Chua ..................... H02J 7/0052 |

OTHER PUBLICATIONS

"Meeting the Challenges of Power-Supply Design for Modern, High-Current CPUs," Mar. 23, 2006, https://www.maximintegrated.com/en/app-notes/index.mvp/id/3767.

PCT/US2016/055803, International Preliminary Report and Written Opinion, dated Jul. 5, 2018, (11 pages).

\* cited by examiner

POWER DELIVERY ARCHITECTURE TO INCREASE PERFORMANCE OF COMPUTING SYSTEMS WHEN DOCKED

FIELD OF THE INVENTION

Embodiments of the present invention relate to the field of power delivery for computing devices (e.g., mobile phones, computer systems, etc.); more particularly, embodiments of the present invention relate to power delivery to a computing system in part from a docking station when the computing system is docked, which may allow the computing system to increase performance by using the additional power that it receives.

BACKGROUND OF THE INVENTION

Portable computing systems, such as laptops and mobile phones, run a variety of applications. The different applications utilized different amounts of computing resources to perform various operations. Because some applications require more resources, running those applications often requires more power consumption. However, as designers of portable computing systems have tried to develop lighter or more streamlined versions of such devices with reduced power consumption, some devices are not capable of executing some applications that require more power or cannot run such applications on certain devices or run them fully as running these applications increases power consumption and depletes power resources (e.g., batteries) too quickly for a user. Thus, it would be desirable to be able to provide additional power resources at times to allow such devices to execute such applications.

Docking stations are well known in the art to provide an easy way for a computing device such as a laptop computer to connect to peripheral devices. By simply plugging the computing device into the docking station, the computing device is able to access the peripheral devices.

The use of docking stations is not limited to connecting to peripheral devices. Docking stations have been used to increase performance of a computing device because the docking station provides some functionality to facilitate the higher performance. For example, some docking stations for laptops provide thermal functionality such that when a computing system is plugged into the docking station, the docking station blows air on the laptop to provide additional cooling for higher performance when the laptop is used on a desk. Additional graphics or storage has been including in docking stations to enhance functionality as well.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Figure 1:
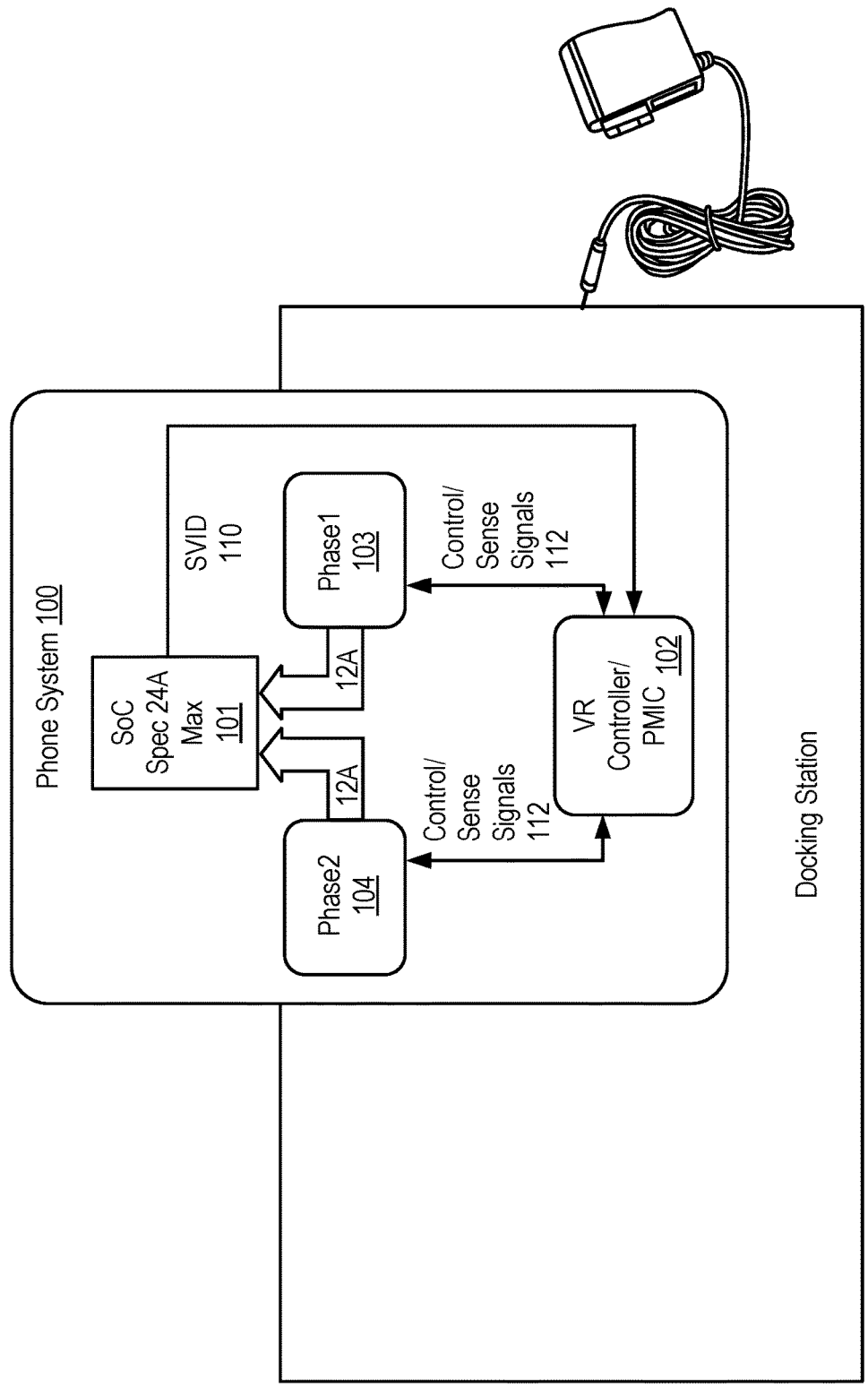
FIG. 1 is a block diagram of a phone system with a docking station.

FIG. 1 is a block diagram of a phone system with a docking station. The phone system may be docked or undocked with the docking station. Referring to FIG. 1, phone system 100 comprise a system-on-a-chip (SoC) 101 that is powered by two power phases, referred to herein phase 1 and phase 2. Both phases 1 and 2 are each 12 A and are provided by power stages 103 and 104, respectively. A voltage regulator (VR) controller, or power management integrated circuit (PMIC), 102 is coupled to power stages 103 and 104 via control and sense signals 111 and 112, respectively. Using signals 111 and 112, VR controller 102 senses the power being provided by power stages 103 and 104 and controls power stages 103 and 104. The control of power stages 103 and 104 by VR controller 102 may be in response to signals from SoC 101 received on a Serial Voltage Identification (SVID) bus 110. For example, SoC 101 may specify a power state into which SoC 101 is to transition. In such as case, VR controller 102 receives this information over SVID bus 110 and uses signals 111 and 112 to power down one or both of phase 1 and phase 2, respectively, depending on the power state specified by SoC 101.

Figure 2:
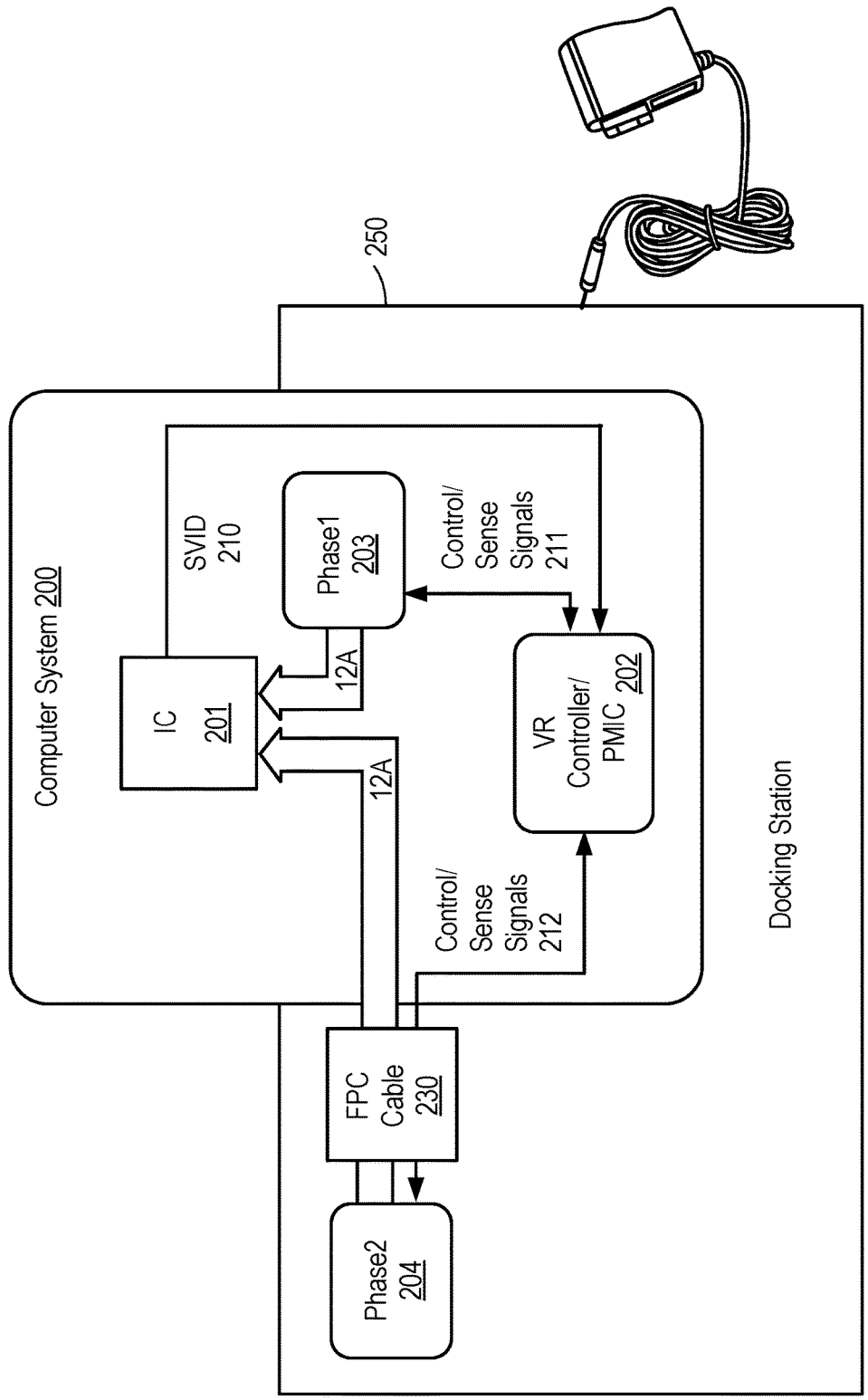
FIG. 2 is a block diagram of one embodiment of a system architecture having a computing system and a docking station.

FIG. 2 is a block diagram of one embodiment of a system architecture having a computing system and a docking station. In one embodiment, the computing system is a portable device. The computing system may be phone, a laptop or other computer system, tablet, personal digital assistant (PDA), etc. The computing system is removably coupled to the docking station so that it can be coupled or uncoupled by a user. In one embodiment, the computing system has a number of components (e.g., integrated circuits (ICs)), including a power delivery subsystem to deliver power to components under direction of a controller. The controller is communicably coupled to the docking station such that when the computing system is docked in or on the docking station, the controller is able to cause power from the docking station to be delivered to at least one of the components along with power separately provided from the power delivery system.

Referring to FIG. 2, computing system 200 (e.g., a phone system, laptop computer, etc.) comprise an integrated circuit (IC) component 201 (e.g., a system-on-a-chip (SoC), processor, controller, etc.) that is powered by one or two phases. Phase 1 is provided by power state 203, which is part of computing system 200. Phase 2 is provided by power stage 204 which is part of docking station 250. However, because phase 2 is provided by docking station 250, computing system 200 only receives phase 2 from power stage 204 when computing system 200 is docked, or otherwise coupled to, docking station 250. Note that other components in computing system 200 may be powered by one or both phases 1 and 2.

In one embodiment, both phases 1 and 2 are each 12 A, thereby having a 50/50 split between the power provided by the two sources to IC 201. However, in other embodiments, the two phases do not have to provide the same amount of power and other splits are possible. That is, other percentages could be used. For example, one phase may provide 70% of the power while the other phase provides 30% of the power to IC 201. To provide a total of 24 A, other examples include having one phase providing 9 A, while the other phase provides 15 A or one phase providing 3 A, while the other phase provides 21 A. Note that the teachings disclosed herein are not limited to providing 24 A. This is merely an example. The split between phases may be based on the computing system size (e.g., the phone system size) and the available real estate of the computing system.

Furthermore, the teachings disclosed herein are not limited to having only two phases. There may be three or more phases. In such a case, in one embodiment, the computing system may have multiple power stages providing multiple phases, with only one phase provided by the docking station, or in another embodiment, the docking station may have multiple power stages providing multiple phases, with only one phase (or more than one phase) provided by the computing system.

Computing system 200 includes a voltage regulator (VR) controller 202. In one embodiment, VR controller 202 is part of a power management integrated circuit (PMIC). VR controller 202 is coupled to power stage 203 via control and sense signals 211. When computing system 200 is docked with docking station 250, VR controller 202 is also coupled (e.g., communicably coupled) to power stage 204 via control and sense signals 212.

In one embodiment, docking station 250 is coupled to provide power to IC 201 and signaling with controller 202 through a connector 230. In one embodiment, connector 230 comprises a flexible printed circuit (FPC) cable. In another embodiment, connector 230 includes contacts that mate with contacts of computing system 200 when computing system 200 is docked with docking station 250. Note that other cables/connections having low impedance and a minimum voltage drop may be used as well.

Using signals 211 and 212, VR controller 202 senses the power being provided by power stages 203 and 204 and controls power stages 203 and 204. The control of power stages 203 and 204 by VR controller 202 may be in response to signals from IC 201 received on SVID bus 210. For example, IC 201 may specify a power state into which IC 201 is to transition. In such as case, VR controller 202 receives this information over SVID bus 210 and uses signals 211 and 212 to control the power delivery by power stage 203 itself when undocked and by power stages 203 and 204 when docked in docking station 250. The control may including powering down one or both of phase 1 and phase 2 depending on the power state specified by IC 201.

In one embodiment, IC 201 comprises a configurable load line that is changed in response to computing system 200 being docked with or undocked from docking station 250. In one embodiment, the control provided by VR controller 202 with respect to the power provided by power stage 203 and power stage 204 (if docked) is based on the dynamically changeable load line. In one embodiment, IC 201 includes an input (e.g., pin, contact, etc.) to receive an indication (e.g., a signal) as to whether computing system 200 is docked in docking station 250 and configures the load line and controls VR controller 202 based on the indication.

In one embodiment, IC 201 also has a current limit that is removed in response to computing system 200 being docked in docking station 250. In this case, there is no limit or default. That is, if there is no limit, the maximum current specification for IC 201 is the limit. In one embodiment, this is controlled based knowledge of the power capability of the system to supply power to IC 201. This can ca be performed statically by setting the BIOS. In another embodiment, dynamic battery power sensing technology knows what the power to IC 201 is and dynamically changes the Iccmax current limitation based on the input power source capability.

Figure 3:
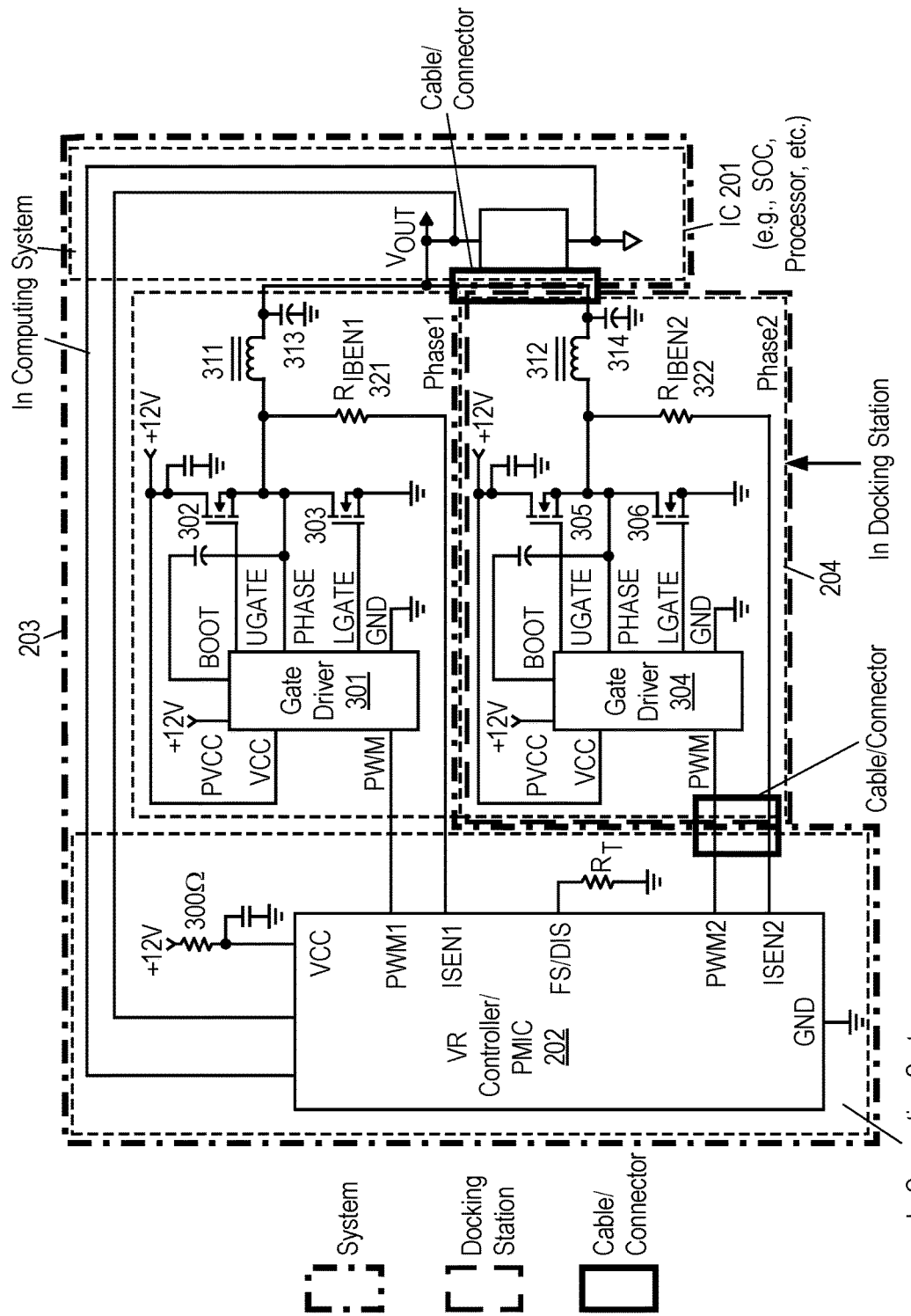
FIG. 3 is a more detailed block diagram of an embodiment of a VR-based power delivery system.

FIG. 3 is a more detailed block diagram of an embodiment of a VR-based power delivery system. Referring to FIG. 3, as in FIG. 2, VR controller 202 generates power and provides the power to power stages 203 and 204, which represent phases 1 and 2, respectively. Each of power stages 203 and 204 includes a gate driver and power gate switches (e.g., field effect transistors (FETs)). For example, power stage 203 includes gate driver 301 coupled to FETs 302 and 303, while power stage 204 includes gate driver 304 coupled to FETs 305 and 306. FETs 302 and 305 are connected to the system power, while FETs 303 and 306 regulate the output voltage. Each of the power stages 203 and 204 outputs power to inductors 311 and 312, respectively. Each of the inductors 311 and 312 are coupled to bulk and ceramic capacitors 313 and 314, respectively, which outputs a voltage Vout. The output voltage Vout is provided to power one or more ICs and devices, such as IC 201 (e.g., CPU, processor, SoC, etc.). Also, both power stages includes a sensing resistor (321, 322) to enable VR controller 202 to sense the power each power stage is providing.

Figure 4:
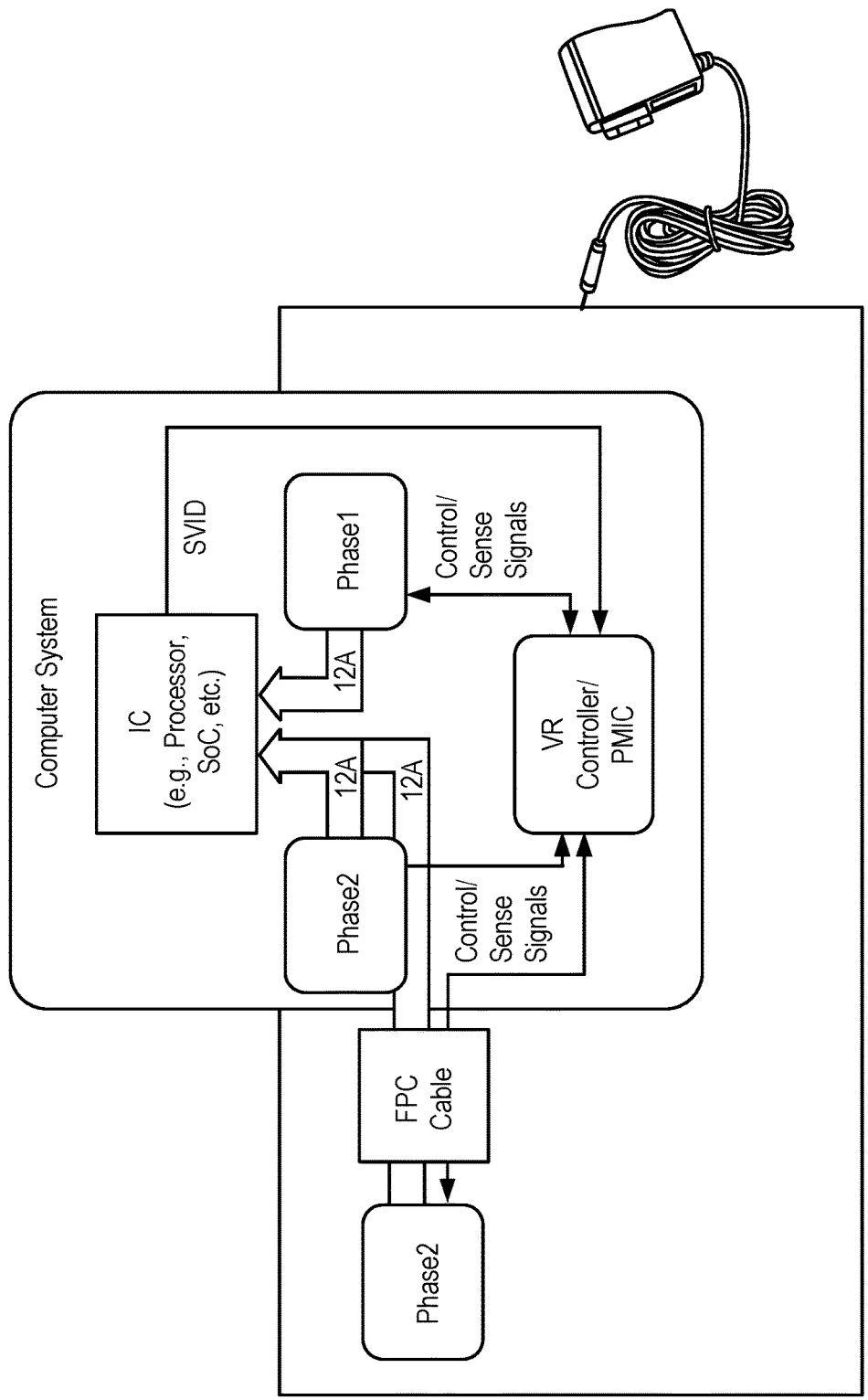
FIG. 4 is a block diagram of another embodiment of a system architecture having a computing system and a docking station.

FIG. 4 is a block diagram of another embodiment of a system architecture having a computing system and a docking station. The system architecture in FIG. 3 is similar to that of FIG. 2 except the computing system 300 also is able to provide phase 2 power to IC 301 in the same way as phase 2 power is provided in FIG. 1.

There are two basic limitations to the power delivery. First, there is real estate limitation that limits the amount of power delivery that can be placed in the system. Second, besides real estate, the proximity of the power delivery subsystem to the IC (e.g., processor, SoC, etc.). These two traditional power deliver limitations, the amount of power that can be drawn from the FETs, which is limited as the current maximum of an IC, referred to herein as ICCmax, and the speed at which power can be drawn by the IC, which is limited by the AC load line of the IC, are overcome by the techniques described herein.

More specifically, in one embodiment, IC 201 has a programmable load line which allows for relaxing the requirement on the proximity when in docked mode without affecting the operation of the device in un-docked mode. By having a programmable load line, the power delivery may be split between the device and the docking station, thereby significantly improving the performance in docked mode without degrading the performance in the device mode. Thus, there are two different power delivery implementations with different requirements, which are made possible by the configurable AC load lines of the IC.

Figure 5A:
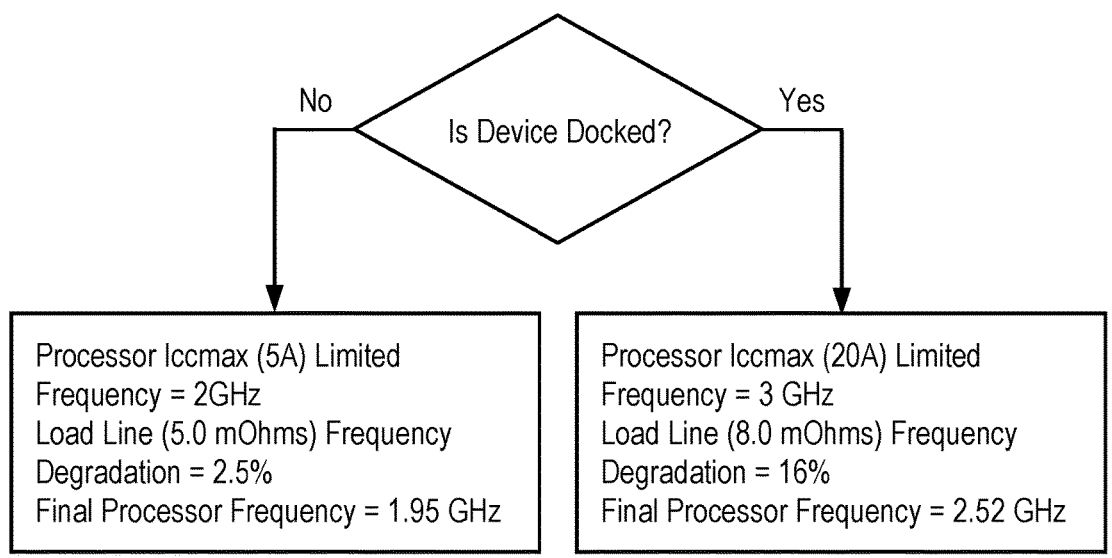
FIG. 5A is an example processing flow that explains the concept with some example numbers for a design.

FIG. 5A is an example processing flow that explains the concept with some example numbers for a design. Referring to FIG. 5A, the IC (e.g., IC 201) performs a test to determine if the computing system is docked in the docking station, referred to herein as being docked, or is undocked from the docking station, referred to herein as device mode. In one embodiment, the results of the test are based on information from a logical pin of the IC to inquire as to whether the computing system is in docked or device mode. The information indicates to the IC whether the other power phase is available, which controls the IC so that it never draws more power than is available to it.

In one embodiment, the IC has the capability to program the load line and Iccmax dynamically. In one embodiment, these are programmed independently. In one embodiment, the load line is programed statically (e.g., programming a Basic Input Output System (BIOS) setting). In one embodiment, if the device is in docked mode, the Iccmax limit is removed or at least set sufficiently high that it no longer limits performance. In one embodiment, the frequency of the processor is only limited by the load line. For example, in one IC for an ideal zero load line, the processor frequency limit is 3 Ghz. However because part of the power delivery is in the device, the load line is degraded from an ideal zero to 8 mOhms. The load line degrades due to the impedance (e.g., resistance) of the printed circuit board (PCB) formed and the components, which cause the drop. The noise is 160 mV so there is a loss of nearly 360 Mhz for a nominal 1V IC. The net frequency is 2.54 Ghz. If the device is in un-docked mode, in one embodiment, the current limit (e.g., Iccmax) is reset to 5 A and the load line is improved from 8 mOhms to 5 mOhms. In this case, the device Iccmax limit is about 2 Ghz. The AC load line loss is only 100 mV 200 Mhz (10%) frequency loss. The net frequency is 1.8 Ghz. Thus, the net gain from going from the device mode to the docked mode is 700 Mhz.

To compensate for power delivery transients, which can occur in nanoseconds, the computing system needs to draw additional current from the dock in a very few clocks. This requires a sufficient amount of charge, in the form of large capacitors very close to the processor. In one embodiment, to accommodate this, more FETs (than available from the computing system 200) are placed in the docking station (e.g., docking station 250) to provide higher steady state currents while reducing the requirements on the transients when in docked mode. This can be done because the AC load line in the IC (e.g., IC 201 (e.g., processor, SoC, etc.)) receiving the power can be programmed.

In one embodiment, the load degradation is reduced when docked to reduce the impact on performance. If the degradation is so large, it wipes out the benefit of the additional Iccmax capability. By placing the FETS and other components in the docking station very close (e.g., less than 10 mm) to the IC being powered, a low impedance path from the docking station to the IC in the computing system being powered by the power delivery subsystem is created. In one embodiment, the low impedance path is created by using very short pin less connectors between the device and docking station.

Figure 5B:
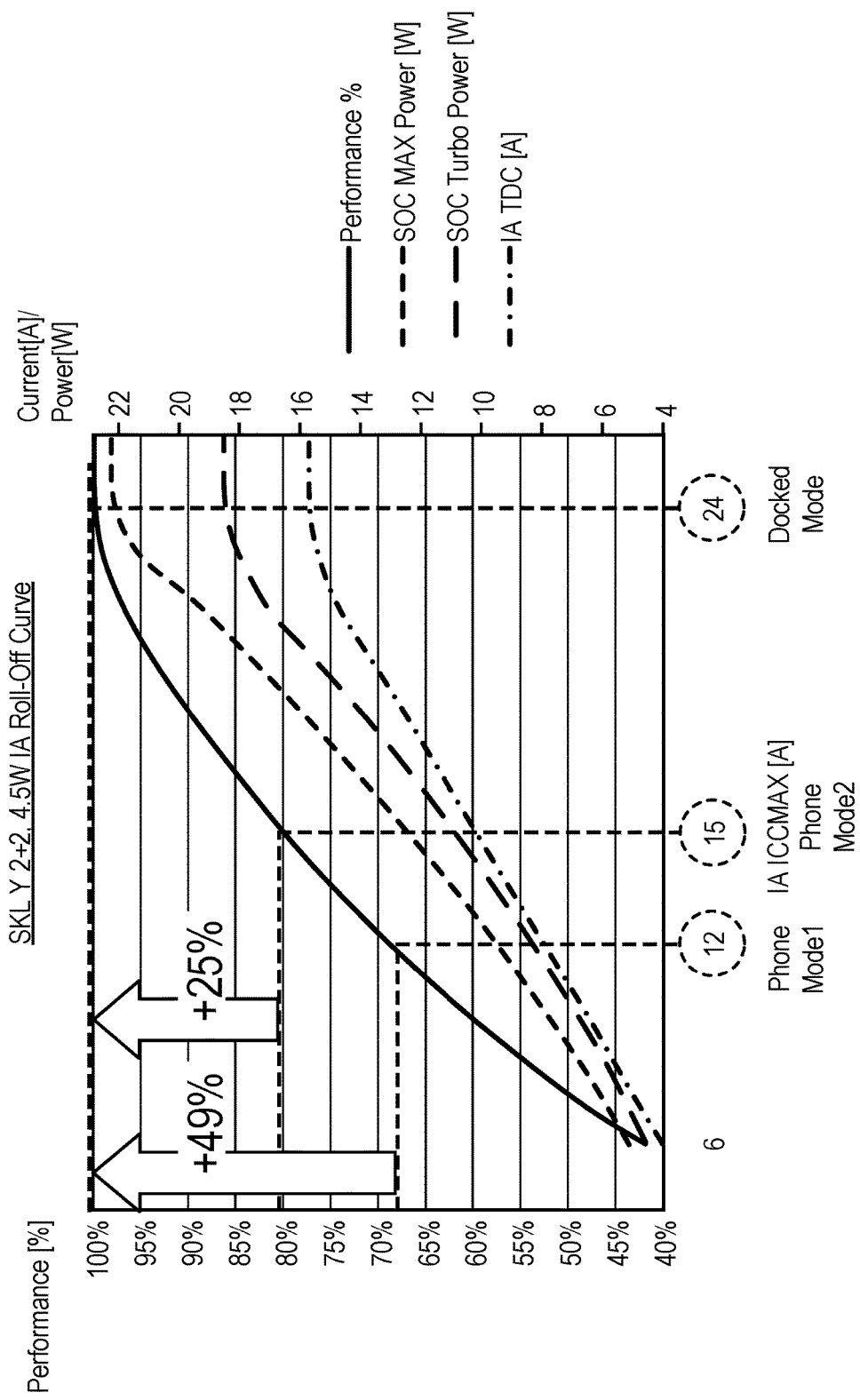
FIG. 5B illustrates an example of estimated performance improvement using the techniques described herein.

FIG. 5B illustrates an example of estimated performance improvement using the techniques described herein. Referring to FIG. 5B, the performance of two different phone modes, referred to as phone mode1 and phone mode2. Phone mode1 is one in which the phone includes a power delivery subsystem that provides a 12 A power phase with another 12 A power phase coming from the docking station, while phone mode2 is one in which the phone includes a power delivery subsystem that provides a 15 A power phase along with 9 A power phase coming from the docking station. In the docket mode, both phones include an IC (e.g., SoC, processor, etc.) that receives 24 A.

With respect to increased performance; when the computing system is docked, in one embodiment, an indicator informs the system and the IC (e.g., IC 201 of FIG. 2, processor, SoC, etc.) that there is more (or adequate) power to run an application which requires high performance (or power). However, in device mode, the system and IC knows there's less power that will limit the maximum frequency at which the IC can run, which limits performance. In one embodiment, whether or not to allow system to run certain applications in device or docked mode is controlled by software or an operating system to limit the usage or apply power based on priority. In one embodiment, using this type of control, photoshop type and other similar applications can only run when computing device is docked. In one embodiment, when in device mode, only the less power and/or performance hungry applications can be used such as, for example, Facebook, text, web surfing, emails, or video playback, where less performance is needed as opposed to, for example, gaming (2D or 2.5D)

Figure 6:
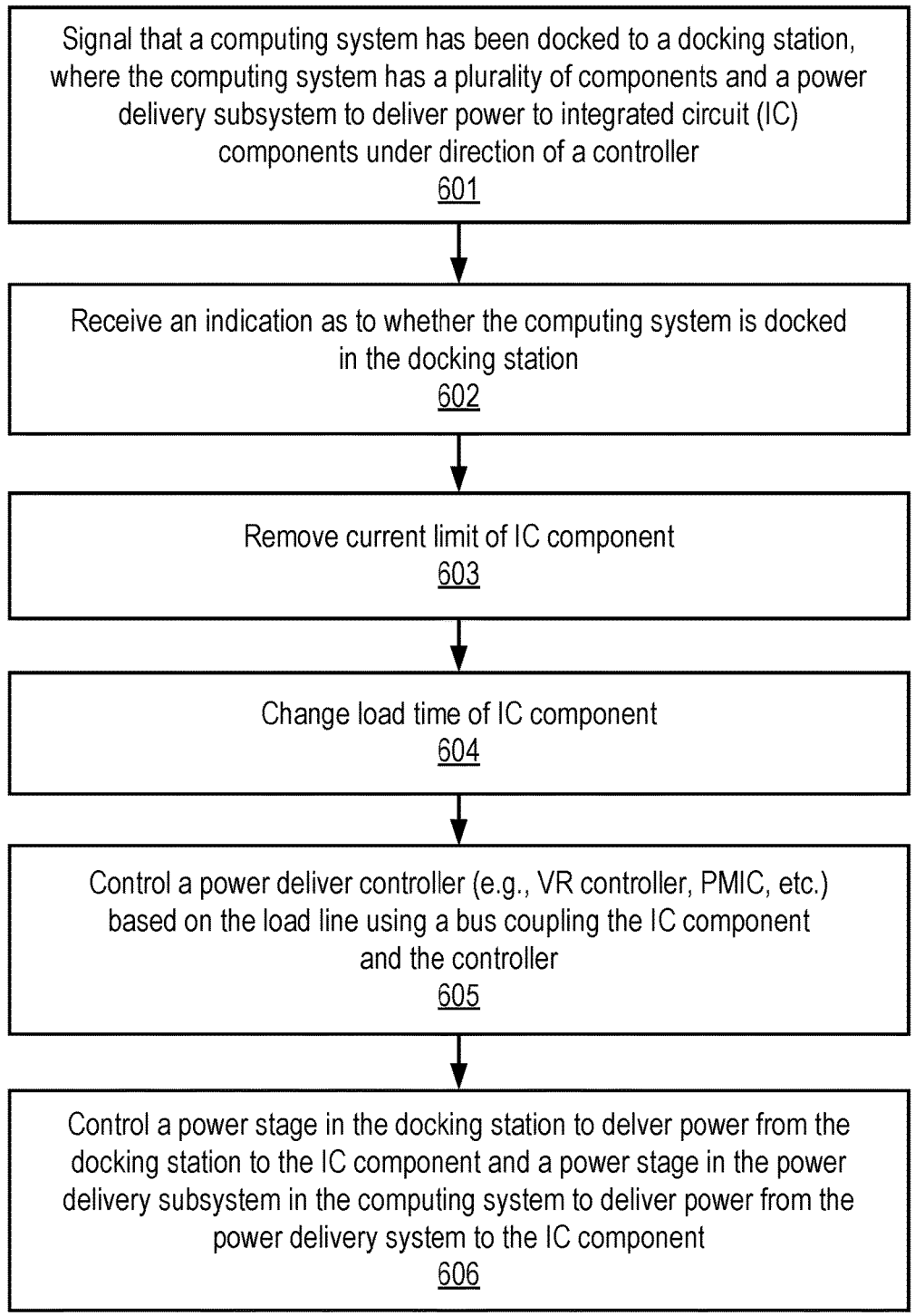
FIG. 6 is a flow diagram of one embodiment a process for controlling power delivery in a computing device.

FIG. 6 is a flow diagram of one embodiment a process for controlling power delivery in a computing device (e.g., computer system, mobile phone system, etc.). The process is performed by processing logic that may comprise hardware (circuitry, dedicated logic, etc.), software (such as is run on a general purpose computer system or a dedicated machine), firmware, or a combination of the three.

Referring to FIG. 6, the process begins by processing logic signaling that a computing system has been docked to a docking station, where the computing system has a plurality of components and a power delivery subsystem to deliver power to integrated circuit (IC) components under direction of a controller (processing block 601).

In response to docking, processing logic in the IC component (e.g., a processor, SoC, controller, etc.) receives an indication as to whether the computing system is docked in the docking station (processing block 602).

In response to receiving the indication, processing logic in the IC component removes its current limit (processing block 603) and changes its load line (processing block 604).

Processing logic in the IC also controls a power deliver controller (e.g., VR controller, PMIC, etc.) based on the load line using a bus coupling the IC component and the controller (processing block 605). In one embodiment, the bus comprises a Serial Voltage Identification (SVID) bus.

In response to the signaling, processing logic in the controller controls a power stage in the docking station to deliver power from the docking station to the IC component and a power stage in the power delivery subsystem in the computing system to deliver power from the power delivery system to the IC component (processing block 606). In one embodiment, this includes signaling the docking station through a connector (e.g., a flexible printed circuit (FPC) cable, contacts, etc.) that is coupled to provide power to the at least one IC component from the docking station.

An Example of a System Containing a Power Delivery System

Figure 7:
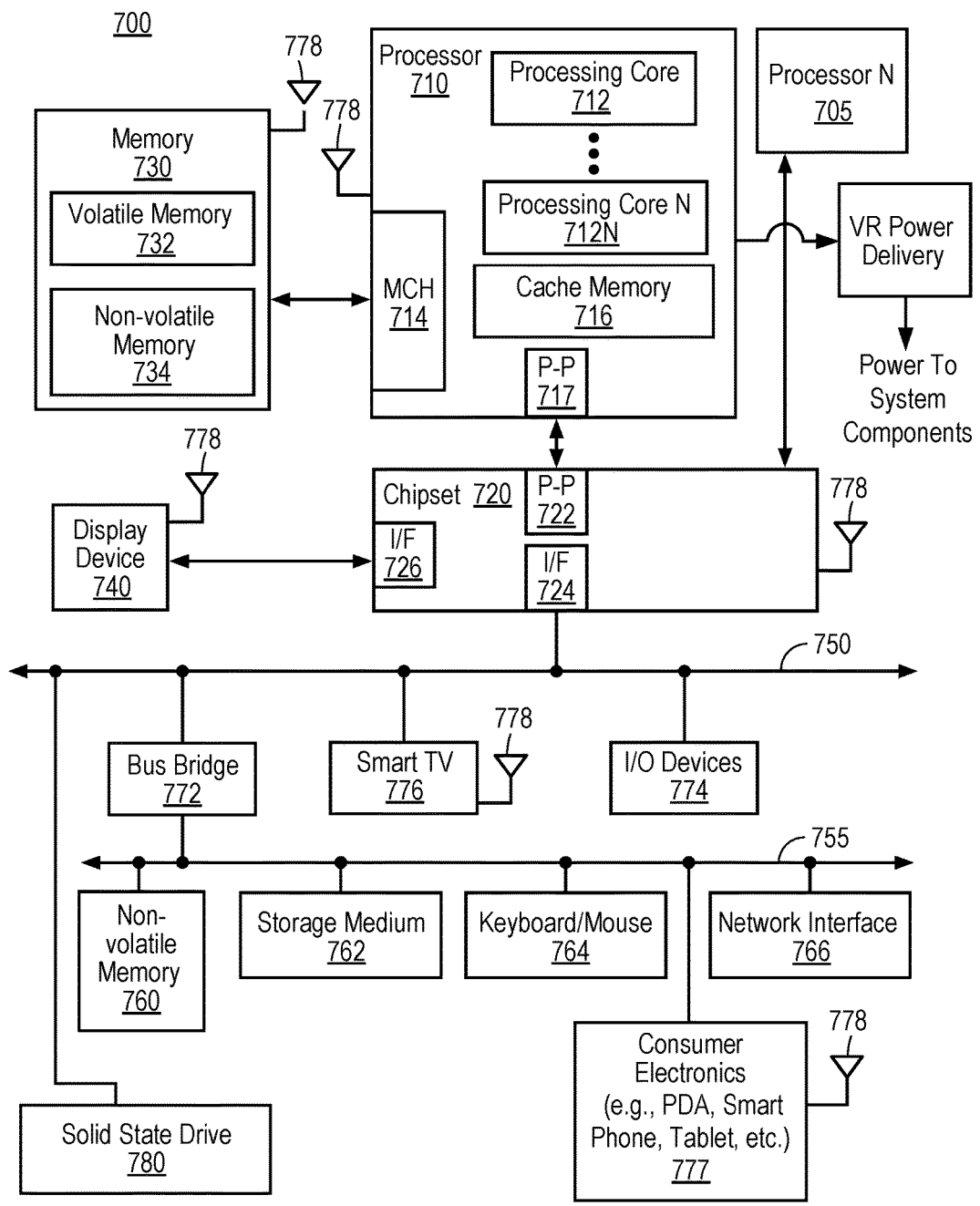
FIG. 7 is one embodiment of a computing system.

FIG. 7 is one embodiment of a system level diagram 700 that may incorporate the techniques described above. For example, the techniques described above may be incorporated into a processor in system 700 or other part of system 700.

Referring to FIG. 7, system 700 includes, but is not limited to, a desktop computer, a laptop computer, a netbook, a tablet, a notebook computer, a personal digital assistant (PDA), a server, a workstation, a cellular telephone, a mobile computing device, a smart phone, an Internet appliance or any other type of computing device. In another embodiment, system 700 implements the methods disclosed herein and may be a system on a chip (SOC) system.

In one embodiment, processor 710 has one or more processor cores 712 to 712N, where 712N represents the Nth processor core inside the processor 710 where N is a positive integer. In one embodiment, system 700 includes multiple processors including processors 710 and 705, where processor 705 has logic similar or identical to logic of processor 710. In one embodiment, system 700 includes multiple processors including processors 710 and 705 such that processor 705 has logic that is completely independent from the logic of processor 710. In such an embodiment, a multi-package system 700 is a heterogeneous multi-package system because the processors 705 and 710 have different logic units. In one embodiment, processing core 712 includes, but is not limited to, pre-fetch logic to fetch instructions, decode logic to decode the instructions, execution logic to execute instructions and the like. In one embodiment, processor 710 has a cache memory 716 to cache instructions and/or data of the system 700. In another embodiment of the invention, cache memory 716 includes level one, level two and level three, cache memory, or any other configuration of the cache memory within processor 710.

In one embodiment, processor 710 includes a memory control hub (MCH) 714, which is operable to perform functions that enable processor 710 to access and communicate with a memory 730 that includes a volatile memory 732 and/or a non-volatile memory 734. In one embodiment, memory control hub (MCH) 714 is positioned outside of processor 710 as an independent integrated circuit.

In one embodiment, processor 710 is operable to communicate with memory 730 and a chipset 720. In such an embodiment, SSD 780 executes the computer-executable instructions when SSD 780 is powered up.

In one embodiment, processor 710 is also coupled to a wireless antenna 778 to communicate with any device configured to transmit and/or receive wireless signals. In one embodiment, wireless antenna interface 778 operates in accordance with, but is not limited to, the IEEE 802.11 standard and its related family, HomePlug AV (HPAV), Ultra Wide Band (UWB), Bluetooth, WiMAX, or any form of wireless communication protocol.

In one embodiment, the volatile memory 732 includes, but is not limited to, Synchronous Dynamic Random Access Memory (SDRAM), Dynamic Random Access Memory (DRAM), RAMBUS Dynamic Random Access Memory (RDRAM), and/or any other type of random access memory device. Non-volatile memory 734 includes, but is not limited to, flash memory (e.g., NAND, NOR), phase change memory (PCM), read-only memory (ROM), electrically erasable programmable read-only memory (EEPROM), or any other type of non-volatile memory device.

Memory 730 stores information and instructions to be executed by processor 710. In one embodiment, chip set 720 connects with processor 710 via Point-to-Point (PtP or P-P) interfaces 717 and 722. In one embodiment, chipset 720 enables processor 710 to connect to other modules in the system 700. In one embodiment, interfaces 717 and 722 operate in accordance with a PtP communication protocol such as the Intel QuickPath Interconnect (QPI) or the like.

In one embodiment, chip set 720 is operable to communicate with processor 710, 705, display device 740, and other devices 772, 776, 774, 760, 762, 764, 766, 777, etc. In one embodiment, chipset 720 is also coupled to a wireless antenna 778 to communicate with any device configured to transmit and/or receive wireless signals.

In one embodiment, chip set 720 connects to a display device 740 via an interface 726. In one embodiment, display device 740 includes, but is not limited to, liquid crystal display (LCD), plasma, cathode ray tube (CRT) display, or any other form of visual display device. In addition, chipset 720 connects to one or more buses 750 and 755 that interconnect various modules 774, 760, 762, 764, and 766. In one embodiment, buses 750 and 755 may be interconnected together via a bus bridge 772 if there is a mismatch in bus speed or communication protocol. In one embodiment, chipset 720 couples with, but is not limited to, a non-volatile memory 760, a mass storage device(s) 762, a keyboard/mouse 764, and a network interface 766 via interface 724, smart TV 776, consumer electronics 777, etc.

In one embodiment, mass storage device 762 includes, but is not limited to, a solid state drive, a hard disk drive, a universal serial bus flash memory drive, or any other form of computer data storage medium. In one embodiment, network interface 766 is implemented by any type of well-known network interface standard including, but not limited to, an Ethernet interface, a universal serial bus (USB) interface, a Peripheral Component Interconnect (PCI) Express interface, a wireless interface and/or any other suitable type of interface.

FIG. 7 also includes power delivery 790 that provides power to components of system 700. In one embodiment, power delivery 790 is a VR-based power delivery system such as, for example, those shown in FIGS. 2-4, and includes one or more reconfigurable coupled inductors as described herein. In one embodiment, power delivery 790 controls the one or more power stages based on control signals from an IC (e.g., SoC, processor, etc.) in the system. In one embodiment, such control signals are sent on a SVID bus.

While the modules shown in FIG. 7 are depicted as separate blocks within the system 700, the functions performed by some of these blocks may be integrated within a single semiconductor circuit or may be implemented using two or more separate integrated circuits.

In a first example embodiment, an apparatus comprises a docking station; and a computing system removably coupled to the docking station and having a plurality of components and a power delivery subsystem to deliver power to integrated circuit (IC) components under direction of a controller, where the controller is communicably coupled to the docking station when the docking station is coupled to the computing system to cause power from the docking station to be delivered to at least one of the components with power from the power delivery system.

In another example embodiment, the subject matter of the first example embodiment can optionally include that the at least one IC component comprises a configurable load line that is changed in response to the computing system being docked in the docking station or undocked from the docking station. In another example embodiment, the subject matter of this example embodiment can optionally include a bus coupling the at least one IC component and the controller to enable the at least one IC component to control the controller based on the load line. In another example embodiment, the subject matter of this example embodiment can optionally include that the bus comprises a Serial Voltage Identification (SVID) bus.

In another example embodiment, the subject matter of the first example embodiment can optionally include that the at least one IC component has a current limit that is removed in response to the computing system being docked in the docking station. In another example embodiment, the subject matter of this example embodiment can optionally include that the at least one IC component includes an input to receive an indication as to whether the computing system is docked in the docking station and configures the load line and controls the controller based on the indication.

In another example embodiment, the subject matter of the first example embodiment can optionally include that the docking station is coupled to provide power to the at least one IC component and signaling with the controller through a connector. In another example embodiment, the subject matter of this example embodiment can optionally include that the connector comprises a flexible printed circuit (FPC) cable. In another example embodiment, the subject matter of this example embodiment can optionally include that the connector includes contacts that mate with contacts of the computing system when the computing system is docked with the docking station.

In another example embodiment, the subject matter of the first example embodiment can optionally include that the at least one IC component comprises a processor or a system-on-a-chip (SoC) and the power delivery subsystem includes a voltage regulator, wherein the controller is operable to control the voltage regulator.

In a second example embodiment, a method comprises signaling that a computing system has been docked to a docking station, wherein the computing system has a plurality of components and a power delivery subsystem to deliver power to integrated circuit (IC) components under direction of a controller, and in response to the signaling, controlling a power stage to deliver power from the docking station to at least one of the components with power from the power delivery system.

In another example embodiment, the subject matter of the second example embodiment can optionally include changing the load line of the at least one IC component in response to the computing system being docked in the docking station or undocked from the docking station. In another example embodiment, the subject matter of this example embodiment can optionally include controlling the controller based on the load line using a bus coupling the at least one IC component and the controller. In another example embodiment, the subject matter of this example embodiment can optionally include that the bus comprises a Serial Voltage Identification (SVID) bus.

In another example embodiment, the subject matter of the second example embodiment can optionally include removing a current limit in response to the computing system being docked in the docking station.

In another example embodiment, the subject matter of the second example embodiment can optionally include receiving an indication, by the at least one IC component, as to whether the computing system is docked in the docking station and changing the load line and controlling the controller based on the indication.

In another example embodiment, the subject matter of the second example embodiment can optionally include signaling between the docking station and the controller through a connector that is coupled to provide power to the at least one IC component from the docking station. In another example embodiment, the subject matter of this example embodiment can optionally include that the connector comprises a flexible printed circuit (FPC) cable. In another example embodiment, the subject matter of this example embodiment can optionally include that the connector includes contacts that mate with contacts of the computing system when the computing system is docked with the docking station.

In another example embodiment, the subject matter of the second example embodiment can optionally include that the at least one IC component comprises a processor or a system-on-a-chip (SoC) and the power delivery subsystem includes a voltage regulator, wherein the controller is operable to control the voltage regulator.

In a third example embodiment, an article of manufacture has one or more non-transitory computer readable media storing instructions which, when executed by a system, cause the system to perform a method comprising: receiving, by an integrated circuit (IC), an indication that a computing system in which the IC resides as to whether the computing system is docked to a docking station; changing the load line of the IC in response to the indication indicating that the computing system is docked in the docking station; and controlling, by the IC, a controller in the computing system that controls a power delivery subsystem that delivers power to the IC based on whether the computing system is docked to a docking station.

In another example embodiment, the subject matter of the second example embodiment can optionally include that the method further comprises signaling a power stage in the docking station to provide power from the docking station to the IC in response to a control signal sent from the IC to the controller.

In another example embodiment, the subject matter of the second example embodiment can optionally include that the method further comprises providing power to the IC from the docking station while the IC also receives power from a power delivery system of the computing system.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. An apparatus comprising:
a docking station; and
a computing system removably coupled to the docking station and having a plurality of components and a power delivery subsystem to deliver power to integrated circuit (IC) components having a first power phase provided by the computing system and a second power phase provided by the docking station under direction of a controller, the controller being communicably coupled to the docking station when the docking station is coupled to the computing system and to control the first power phase and second power phase in delivering power provided by the computing system and docking station to at least one of the IC components, wherein the first power phase and second power phase derive power from different power sources in the computing system and docking station.

2. The apparatus defined in claim 1 wherein the at least one IC component comprises a configurable load line that is changed in response to the computing system being docked in the docking station or undocked from the docking station.

3. The apparatus defined in claim 2 further comprising a bus coupling the at least one IC component and the controller to enable the at least one IC component to control the controller based on the load line.

4. The apparatus defined in claim 3 wherein the bus comprises a Serial Voltage Identification (SVID) bus.

5. The apparatus defined in claim 1 wherein the at least one IC component has a current limit that is removed in response to the computing system being docked in the docking station.

6. The apparatus defined in claim 4 wherein the at least one IC component includes an input to receive an indication as to whether the computing system is docked in the docking station and configures the load line and controls the controller based on the indication.

7. The apparatus defined in claim 1 wherein the docking station is coupled to provide power to the at least one IC component and signaling with the controller through a connector.

8. The apparatus defined in claim 7 wherein the connector comprises a flexible printed circuit (FPC) cable.

9. The apparatus defined in claim 7 wherein the connector includes contacts that mate with contacts of the computing system when the computing system is docked with the docking station.

10. The apparatus defined in claim 1 wherein the at least one IC component comprises a processor or a system-on-a-chip (SoC) and the power delivery subsystem includes a voltage regulator, wherein the controller is operable to control the voltage regulator.

11. A method comprising:
signaling that a computing system has been docked to a docking station, wherein the computing system has a plurality of components and a power delivery subsystem to deliver power having a first power phase provided by the computing system and a second power phase provided by the docking station to integrated circuit (IC) components under direction of a controller; and
in response to the signaling, controlling the first power phase and second power phase in delivering power provided by the computing system and docking station to at least one of the components, wherein the first power phase and second power phase derive power from different power sources in the computing system and docking station.

12. The method defined in claim 11 further comprising changing the load line of the at least one IC component in response to the computing system being docked in the docking station or undocked from the docking station.

13. The method defined in claim 12 further comprising controlling the controller based on the load line using a bus coupling the at least one IC component and the controller.

14. The method defined in claim 13 wherein the bus comprises a Serial Voltage Identification (SVID) bus.

15. The method defined in claim 11 further comprising removing a current limit in response to the computing system being docked in the docking station.

16. The method defined in claim 14 further comprising receiving an indication, by the at least one IC component, as to whether the computing system is docked in the docking station and changing the load line and controlling the controller based on the indication.

17. The method defined in claim 11 further comprising signaling between the docking station and the controller through a connector that is coupled to provide power to the at least one IC component from the docking station.

18. The method defined in claim 17 wherein the connector comprises a flexible printed circuit (FPC) cable.

19. The method defined in claim 17 wherein the connector includes contacts that mate with contacts of the computing system when the computing system is docked with the docking station.

20. The method defined in claim 11 wherein the at least one IC component comprises a processor or a system-on-a-chip (SoC) and the power delivery subsystem includes a voltage regulator, wherein the controller is operable to control the voltage regulator.

21. An article of manufacture having one or more non-transitory computer readable media storing instructions which, when executed by a system, cause the system to perform a method comprising:
  receiving, by an integrated circuit (IC), an indication that a computing system in which the IC resides as to whether the computing system is docked to a docking station;
  changing a load line of the IC in response to the indication indicating that the computing system is docked in the docking station; and
  controlling, by the IC, a controller in the computing system that controls a power delivery subsystem that delivers power having a first power phase provided by the computing system and a second power phase provided by the docking station to the IC based, wherein the controller controls the first power phase and second power phase in delivering power provided by the computing system and docking station to the IC and wherein the first power phase and second power phase derive power from different power sources in the computing system and docking station.

22. The article of manufacture defined in claim 21 wherein the method further comprises signaling a power stage in the docking station to provide power from the docking station to the IC in response to a control signal sent from the IC to the controller.

23. The article of manufacture defined in claim 22 wherein the method further comprises providing power to the IC from the docking station while the IC also receives power from a power delivery system of the computing system.

* * * * *